United States Patent [19]

Stackhouse

[11] Patent Number: 4,670,197
[45] Date of Patent: Jun. 2, 1987

[54] GAS/LIQUID CONTACT APPARATUS

[75] Inventor: David W. Stackhouse, Sebastopol, Calif.

[73] Assignee: Custodis-Ecodyne, Santa Rosa, Calif.

[21] Appl. No.: 901,930

[22] Filed: Aug. 29, 1986

[51] Int. Cl.$^4$ ............................................. B01F 3/04
[52] U.S. Cl. .................................. 261/112; 428/183; 428/185
[58] Field of Search ................. 261/112; 428/182–185

[56] References Cited

U.S. PATENT DOCUMENTS

| | | | |
|---|---|---|---|
| 3,037,592 | 6/1962 | Shipley et al. | 428/185 |
| 3,151,947 | 10/1964 | Hastings | 428/183 |
| 3,612,494 | 10/1971 | Toyama et al. | 261/112 |
| 3,862,280 | 1/1975 | Polovina | 261/112 |
| 3,887,664 | 6/1975 | Regehr | 261/112 |
| 3,963,810 | 6/1976 | Holmberg et al. | 261/112 |
| 4,139,584 | 2/1979 | Holmberg | 261/112 |
| 4,512,938 | 4/1985 | Jones et al. | 261/112 |

Primary Examiner—Tim Miles
Attorney, Agent, or Firm—Dressler, Goldsmith, Shore, Sutker & Milnamow

[57] ABSTRACT

A gas/liquid contact apparatus which includes a plurality of packing sheets arranged in parallel, vertical, upright, face to face relationship. The packing sheets have a series of inclined corrugations formed therein. Each of the corrugations are formed so as to define an alternating series of longitudinally extending oppositely inclined surfaces which intersect and pass through a center plane of the packing sheet so as to define hills and valleys. The inclined surfaces have an amplitude relative to the center plane of the packing sheet which is opposite that of the adjacent inclined surfaces of an adjacent corrugation. The packing sheets are arranged adjacent each other such that the corrugations of adjacent packing sheets are oppositely oriented. The adjacent packing sheets are secured together where the hills of one of the packing sheets contacts the valleys of an immediately adjacent packing sheet.

9 Claims, 6 Drawing Figures

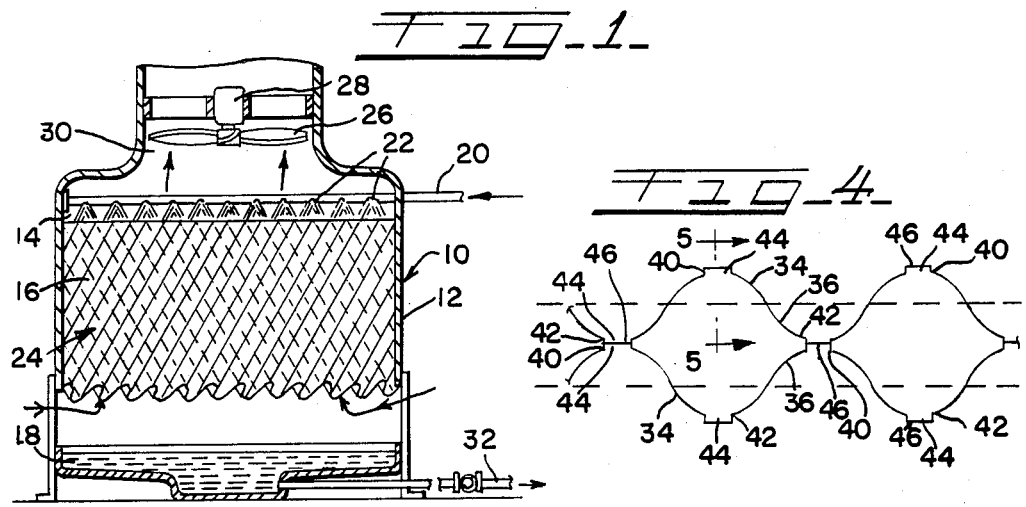
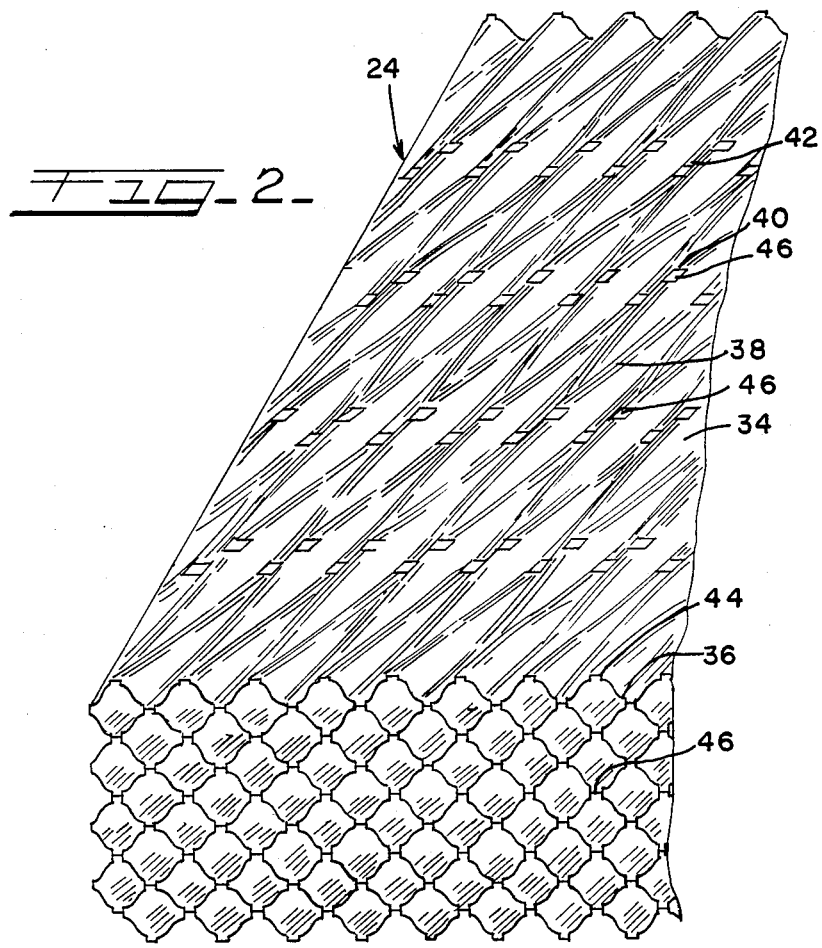

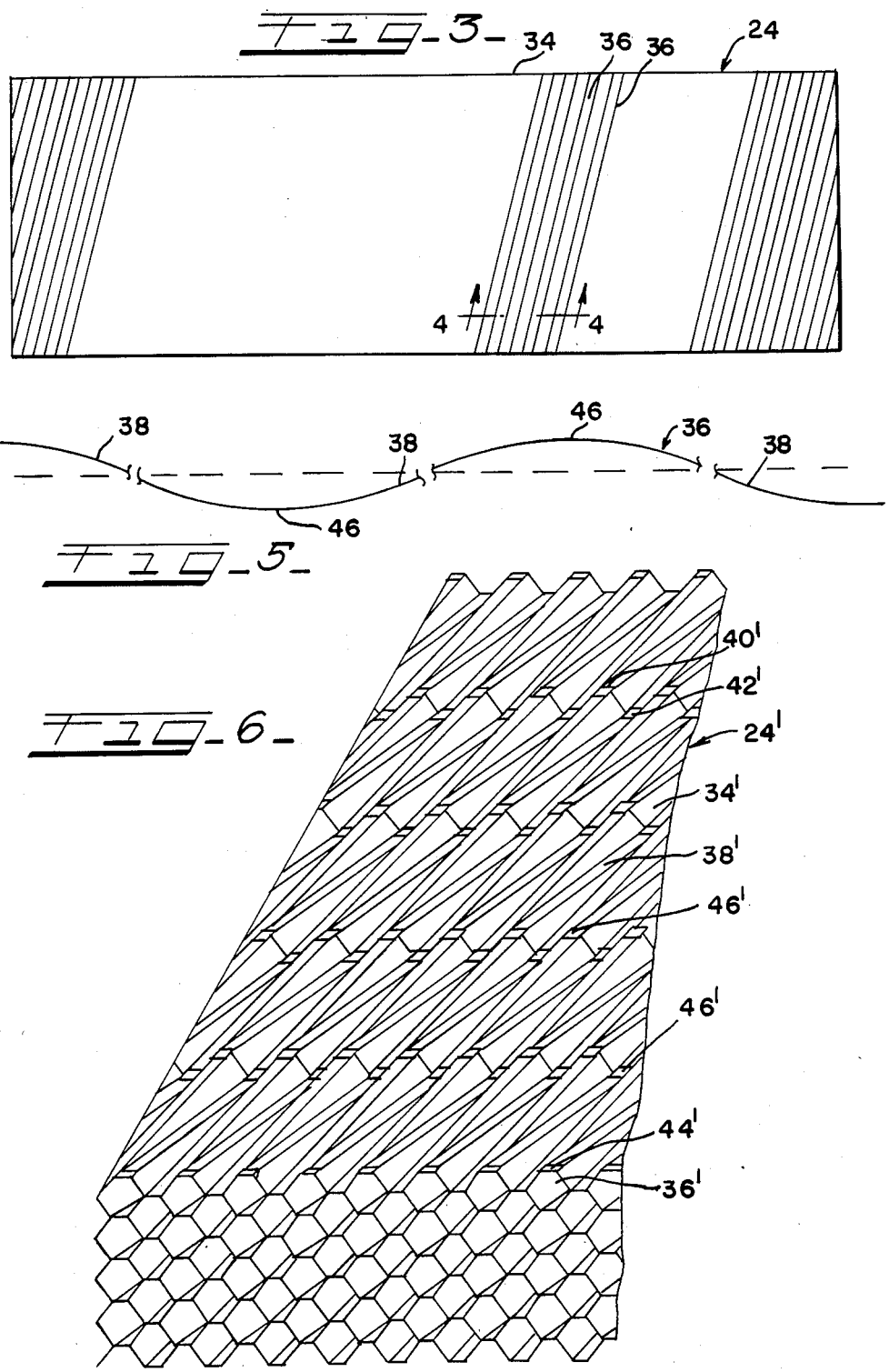

GAS/LIQUID CONTACT APPARATUS

FIELD OF THE INVENTION

The present invention relates generally to an improved gas/liquid contact apparatus and, more specifically, to a gas/liquid contact apparatus for use as a film type fill packing in cooling towers.

BACKGROUND OF THE INVENTION

In providing a heat exchange surface for a cooling tower or the like, a variety of different types of contact body elements have been utilized in forming cooling tower fill sections to bring water into intimate contact with air in a cooling tower. The water to be cooled is typically sprayed onto the contact body elements where it forms a thin film. Air is drawn between the space between the contact body elements and into contact with the water film which is thereby cooled.

One such type of contact body element arrangement includes a film type fill packing comprising a plurality of corrugated packing sheets disposed in a vertical, parallel relationship such that the corrugations form channels in which water to be cooled is brought into contact with cooling air. The corrugations of adjacent sheets are typically arranged at opposite angles to provide mechanical strength and enhance the distribution of water and air within the fill packing. Examples of such prior art fill packings are disclosed in U.S. Pat. Nos. 3,862,280, 4,139,584, and 4,512,938.

The present invention is directed to an improved fill packing design, of the general type described hereinabove, which provides increased open space between adjacent packing sheets to reduce resistance to air flow and provides a minimal number of contact points between adjacent packing sheets to improve water and air distribution.

SUMMARY OF THE INVENTION

According to the present invention, a gas/liquid contact apparatus is provided which includes a plurality of packing sheets arranged in parallel, vertical, upright, face to face relationship. The packing sheets have a series of corrugations formed therein which generally extend at an angle in the range of 10 to 45 degrees from a vertical direction. Each of the corrugations are formed so as to define an alternating series of longitudinally extending oppositely inclined surfaces which intersect and pass through a center plane of the packing sheet so as to define hills and valleys on opposite sides of the center plane. The inclined surfaces have an amplitude relative to the center plane of the packing sheet which is opposite that of the adjacent inclined surfaces of an adjacent corrugation. The packing sheets are arranged adjacent each other such that the corrugations of adjacent packing sheets are oppositely oriented.

The adjacent packing sheets are preferably secured together where the hills of one of the packing sheets contacts the valleys of an immediately adjacent packing sheet. These contact points are preferably formed so as to define generally flat bosses to permit glueing of adjacent packing sheets together. The packing sheets are preferably secured at contact points located at the upper and lower edges thereof.

In accordance with one preferred embodiment of the invention, the corrugations formed in the packing sheets have a generally sinusoidal profile in horizontal cross-section and the inclined surfaces are curved so as to generally define a sinusoidal curve. In accordance with another preferred embodiment of the invention, the corrugations formed in the packing sheets have a generally half hexagonal profile in horizontal cross-section and the inclined surfaces are substantially flat.

The gas/liquid contact apparatus design in accordance with the present invention provides a relatively large open area between the packing sheets which minimizes resistance to air flow. However, a convoluted path is still provided to promote a thorough mixing of water and air which results in a high level of heat transfer efficiency.

BRIEF DESCRIPTION OF THE DRAWINGS

The invention is described in greater detail in the following description of the preferred embodiments thereof, with reference to the accompanying drawings, in which:

FIG. 1 is a vertical longitudinal cross-sectional view through a representative counterflow cooling tower utilizing the gas/liquid contact apparatus of the present invention;

FIG. 2 is a perspective view of a portion of a preferred embodiment of the gas/liquid contact apparatus of the present invention;

FIG. 3 is an elevational side view of the gas/liquid contact apparatus of the present invention;

FIG. 4 is an enlarged sectional view taken along line 4—4 in FIG. 3 showing the corrugation profile of two immediately adjacent packing sheets;

FIG. 5 is a large sectional view taken along line 5—5 in FIG. 4 showing the profile of the inclined surfaces of a corrugation formed in the packing sheet; and FIG. 6 is a perspective view of a portion of an alternative preferred embodiment of the gas/liquid apparatus of the present invention.

DESCRIPTION OF PREFERRED EMBODIMENTS

Referring to FIG. 1, a representative counterflow cooling tower is indicated by the reference numeral 10. Cooling tower 10 includes a housing 12 defining a water distribution zone 14, a gas/liquid contact zone 16, and a water collection zone 18. A liquid, such as water, is directed through a supply line 20 into distribution zone 14 through suitable spray nozzles 22. The gas/liquid contact apparatus 24 is supported within zone 16 directly below distribution zone 14. The water contacts the surfaces of the gas/liquid contact apparatus 24 as it descends through zone 16 and is collected in collection zone 18. A gas, such as air, is directed through gas/liquid contact zone 16 in counter-current relationship to the descending water, as indicated by the arrows in FIG. 1. Air may be drawn into gas/liquid contact zone 16 in an upward direction by a fan 26, driven by a motor 28, both mounted in a gas outlet zone 30 above distribution zone 14. Alternatively, the fan may be eliminated in a natural draft arrangement, as is well known in the art. The water and air are in contact within gas/liquid contact zone 16 in a heat exchange relationship. The water collected in collection zone 18 is directed from tower 10 through an outlet line 32.

Although not specifically shown in the drawings, the gas/liquid contact apparatus of the present invention may also be utilized in a crossflow cooling tower. As is well known in the art, in such cooling towers, the air is directed substantially horizontally across the gas/liquid contact apparatus in contact with the water descending therethrough.

In order to maximize the thermal efficiency of a cooling tower it is desirable to maximize the surface contact of the descending water and the air and promote a thorough mixing thereof, while minimizing the resistance to the flow of air through the cooling tower. The gas/liquid apparatus 24 constructed in accordance with the present invention is specifically designed to optimize the heat transfer efficiency between the water and the air and reduce the resistance to air flowing therethrough.

Referring to FIGS. 2-5, a preferred embodiment of the gas/liquid contact apparatus or film type fill packing 24 will now be described. Fill packing 24 has a plurality of packing sheets 34 generally arranged in a parallel, vertical, upright, face to face relationship. The packing sheets are formed with a series of parallel corrugations 36 which generally extend at an angle in the range of 10 to 45 degrees, and preferably about 15 degrees, from a vertical direction. The corrugations 36 have a generally sinusoidal profile in horizontal cross-section, as best seen in FIG. 4. Referring to FIG. 5, each of the corrugations 36 are formed so as to define an alternating series of longitudinally extending oppositely inclined surfaces 38 which intersect and pass through a center plane of the packing sheet 34 (as indicated by a phantom line in FIGS. 4 and 5) so as to define hills 40 and valleys 42 on opposite sides of the center plane. The inclined surfaces 38 in accordance with a preferred embodiment of the invention are generally a sinusoidal curve. Each of the inclined surfaces 38 has an amplitude relative to the center plane of the packing sheet that is opposite the amplitude of the adjacent inclined surface 38 of an adjacent corrugation 36.

The hills 40 and valleys 42 defined in the corrugations 36 are preferably formed with bosses 44 defining substantially flat surfaces 46 parallel to the center plane of the sheet 34. The inclined surfaces 38 formed in each corrugation 36 are preferably located so as to locate a boss 44 at the upper and lower edges of each corrugation.

The packing sheets 34 are assembled such that the sheets are arranged adjacent each other so that the corrugations 36 of adjacent sheets are oppositely oriented. The adjacent packing sheets 34 are secured together at the contact points defined by the flat surfaces 46 of the bosses 44, preferably by application of a suitable glue thereto. In so doing, the mechanical strength of the packing 24 is sufficient to permit the handling and the operation thereof.

The packing sheets 34 are preferably thermoformed from a suitable plastic material as is well known in the art.

Referring to FIG. 6, an alternative preferred embodiment of the fill packing of the present invention is shown, as indicated by the reference numeral 24'. Packing 24' is similar in construction to packing 24 as hereinabove described. Accordingly, to facilitate the description thereof, the above discussion is incorporated by reference and the corresponding portions thereof are identified by the same reference numeral followed by a prime sign ('). The corrugations 36' formed in packing sheets 34' define a generally half hexagonal profile in horizontal cross-section and the corrugations are formed so as to define inclined surfaces 38' which are substantially flat. The bosses 44' are formed at the intersection between immediately adjacent inclined surfaces 38'. In all other respects the construction of packing 24' are substantially the same as the construction of packing 24.

In use in a cooling tower, the gas/liquid contact apparatus or film type fill packing 24, as decribed hereinabove, defines a convoluted path for water to descend and promotes a thorough mixing of the water and air, which yields a high level of heat transfer efficiency. The specific spacial relationships between the corrugations 34 and the inclined surfaces 38 provides a large open area between adjacent packing sheets 34, which minimizes resistance to air flow through the packing. Further, the minimal number of contact points between adjacent packing sheets improves water and air distribution through the packing.

While the foregoing describes preferred embodiments of the present invention, other modifications and/or equivalents may be employed without departing from the scope of the invention, which is defined in the appended claims.

What is claimed is:

1. Apparatus for gas/liquid contact, comprising:
   (a) a plurality of packing sheets arranged in a parallel, vertical, upright, face to face relationship;
   (b) each of said packing sheets having a series of parallel corrugations formed therein which generally extend at an angle in the range of 10 to 45 degrees from a vertical direction;
   (c) each of said corrugations being formed so as to define an alternating series of longitudinally extending oppositely inclined surfaces which intersect and pass through a center plane of the packing sheet so as to define hills and valleys on opposite sides of the center plane;
   (d) wherein each of said inclined surfaces has an amplitude relative to the center plane that is opposite that of the adjacent inclined surface of an adjacent one of said corrugations; and
   (e) said packing sheets being arranged adjacent to each other such that said corrugations of adjacent packing sheets are oppositely oriented.

2. The invention as defined in claim 1 wherein said adjacent packing sheets are secured together at contact points wherein the hills of one of said packing sheets contact the valleys of an immediately adjacent packing sheet.

3. The invention as defined in claim 2 wherein said packing sheets are formed with bosses defining substantially flat surfaces at said contact points.

4. The invention as defined in claim 2 wherein said adjacent packing sheets are glued together at said contact points.

5. The invention as defined in claim 1 wherein said corrugations have a generally sinusoidal profile in horizontal cross-section.

6. The invention as defined in claim 1 wherein said corrugations have a generally half hexagonal profile in horizontal cross-section.

7. The invention as defined in claim 5 wherein said inclined surfaces are curved so as to generally define a sinusoidal curve.

8. The invention as defined in claim 6 wherein said inclined surfaces are substantially flat.

9. The invention as defined in claim 2 wherein the inclined surfaces are defined in each of said corrugations so that said packing sheets are secured at said contact points located at the upper and lower edges thereof.

* * * * *